(12) United States Patent
Fages

(10) Patent No.: US 10,953,978 B2
(45) Date of Patent: Mar. 23, 2021

(54) PROPELLER COUNTERWEIGHT

(71) Applicant: Ratier-Figeac SAS, Figeac (FR)

(72) Inventor: Christian Fages, Saint-Felix (FR)

(73) Assignee: RATIER-FIGEAC SAS, Figeac (FR)

( * ) Notice: Subject to any disclaimer, the term of this patent is extended or adjusted under 35 U.S.C. 154(b) by 286 days.

(21) Appl. No.: 15/806,547

(22) Filed: Nov. 8, 2017

(65) Prior Publication Data

US 2018/0141638 A1 May 24, 2018

(30) Foreign Application Priority Data

Nov. 21, 2016 (EP) ..................... 16306523

(51) Int. Cl.
| | | |
|---|---|---|
| *B64C 11/34* | (2006.01) | |
| *B64C 11/38* | (2006.01) | |
| *B33Y 80/00* | (2015.01) | |
| *B33Y 10/00* | (2015.01) | |
| *B64C 11/32* | (2006.01) | |

(52) U.S. Cl.
CPC ............ *B64C 11/346* (2013.01); *B33Y 80/00* (2014.12); *B64C 11/385* (2013.01); *B33Y 10/00* (2014.12); *B64C 11/325* (2013.01)

(58) Field of Classification Search
CPC ..... B64C 11/364; B64C 11/325; B64C 11/06; B64C 11/30; B33Y 80/00; B33Y 10/00; F01D 7/02
USPC .......................................................... 416/139
See application file for complete search history.

(56) References Cited

U.S. PATENT DOCUMENTS

| | | | | |
|---|---|---|---|---|
| 1,967,461 A | * | 7/1934 | Ballew .................. | B64C 11/346 416/136 |
| 2,054,947 A | * | 9/1936 | Zelie Riddle ......... | B64C 11/346 416/53 |
| 2,349,187 A | * | 5/1944 | Meyer ...................... | F01D 5/16 416/190 |
| 2,419,893 A | * | 4/1947 | Hackethal ............. | B64C 11/346 416/139 |
| 2,584,018 A | * | 1/1952 | Hughes .................. | B64C 11/346 416/139 |
| 3,580,694 A | * | 5/1971 | Andersen ................ | F24F 13/14 416/136 |

(Continued)

FOREIGN PATENT DOCUMENTS

| | | |
|---|---|---|
| EP | 2796367 A1 | 10/2014 |
| EP | 3141476 A1 | 3/2017 |
| GB | 2482545 A | 2/2012 |

OTHER PUBLICATIONS

Extended European Search Report for International Application No. 16306523.8 dated Jun. 14, 2017, 5 pages.

*Primary Examiner* — Michael Lebentritt
(74) *Attorney, Agent, or Firm* — Cantor Colburn LLP

(57) ABSTRACT

A counterweight for use in a variable-pitch propeller system (includes a weighted element having walls forming a sealed chamber). The sealed chamber contains a weighting material, and an arm. The counterweight is configured to be coupled to a propeller blade the walls of the weighted element and the arm comprise a single piece, and are an additively manufactured single piece. The weighting material may comprise a powder element. The sealed chamber may have been sealed during the additive manufacturing process, or after the additive manufacturing process has been completed.

14 Claims, 2 Drawing Sheets

(56) References Cited

U.S. PATENT DOCUMENTS

| | | | | |
|---|---|---|---|---|
| 3,602,977 A * | 9/1971 | Huet | B22F 3/20 | 419/67 |
| 4,913,623 A * | 4/1990 | Schilling | B64C 11/346 | 416/129 |
| 5,257,907 A * | 11/1993 | Seidel | F03D 7/0224 | 416/137 |
| 5,425,619 A * | 6/1995 | Aylor | F03D 1/00 | 416/117 |
| 5,590,386 A * | 12/1996 | Patrician | B22F 3/23 | 419/20 |
| 5,618,170 A * | 4/1997 | Hogdahl | F01C 21/0836 | 418/106 |
| 5,758,611 A * | 6/1998 | Collins | F02B 25/12 | 123/197.3 |
| 5,836,743 A * | 11/1998 | Carvalho | B64C 11/385 | 416/139 |
| 5,997,250 A * | 12/1999 | Carter, Jr. | B64C 11/40 | 416/1 |
| 6,155,784 A * | 12/2000 | Carter, Jr. | B64C 11/06 | 416/134 A |
| 9,458,730 B2 * | 10/2016 | Carvalho | B64C 11/385 | |
| 9,527,579 B2 * | 12/2016 | Carvalho | B64C 11/325 | |
| 9,765,625 B2 * | 9/2017 | Stiehler | F01D 5/10 | |
| 10,001,016 B2 * | 6/2018 | Stiehler | B23P 15/04 | |
| 10,247,003 B2 * | 4/2019 | Himes | F01D 25/06 | |
| 2012/0222359 A1 * | 9/2012 | Ayshford | E05F 1/02 | 49/387 |
| 2013/0183143 A1 * | 7/2013 | Gallet | B64C 11/308 | 415/130 |
| 2014/0060240 A1 * | 3/2014 | Riordan | B64D 41/007 | 74/570.1 |
| 2014/0193253 A1 * | 7/2014 | Carvalho | B64C 11/346 | 416/1 |
| 2014/0361539 A1 * | 12/2014 | Carter | F03D 7/06 | 290/44 |
| 2015/0118052 A1 * | 4/2015 | Carvalho | B64C 11/325 | 416/139 |
| 2015/0239046 A1 * | 8/2015 | McMahan | B23K 15/0093 | 428/548 |
| 2015/0300868 A1 * | 10/2015 | Smyers | G01F 23/34 | 73/317 |
| 2015/0323053 A1 * | 11/2015 | El-Wardany | F16H 55/17 | 74/457 |
| 2016/0061038 A1 * | 3/2016 | Herbruck | F01C 1/324 | 418/142 |
| 2016/0237825 A1 * | 8/2016 | Himes | F01D 25/06 | |
| 2017/0051751 A1 * | 2/2017 | Ackermann | F01D 5/06 | |
| 2018/0222579 A1 * | 8/2018 | Simon | B64C 27/32 | |
| 2018/0318922 A1 * | 11/2018 | Valls Angles | B22F 1/0003 | |
| 2019/0093510 A1 * | 3/2019 | Pouzet | B33Y 70/00 | |
| 2019/0219037 A1 * | 7/2019 | Chang | F03G 7/10 | |
| 2019/0291186 A1 * | 9/2019 | Aston | H01Q 19/108 | |

* cited by examiner

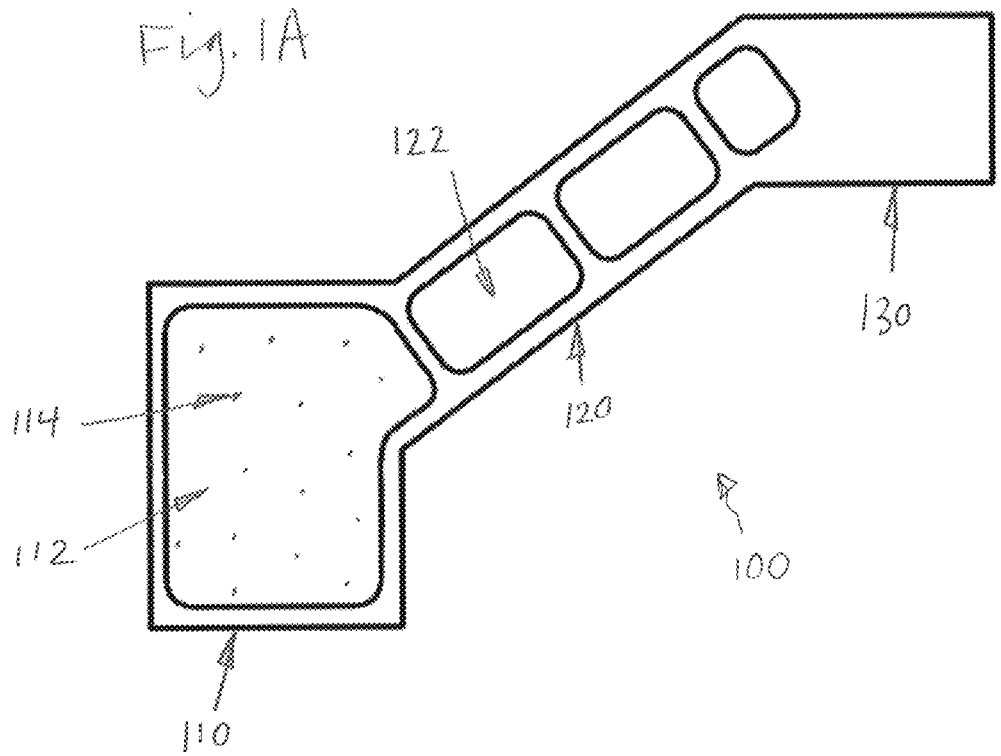
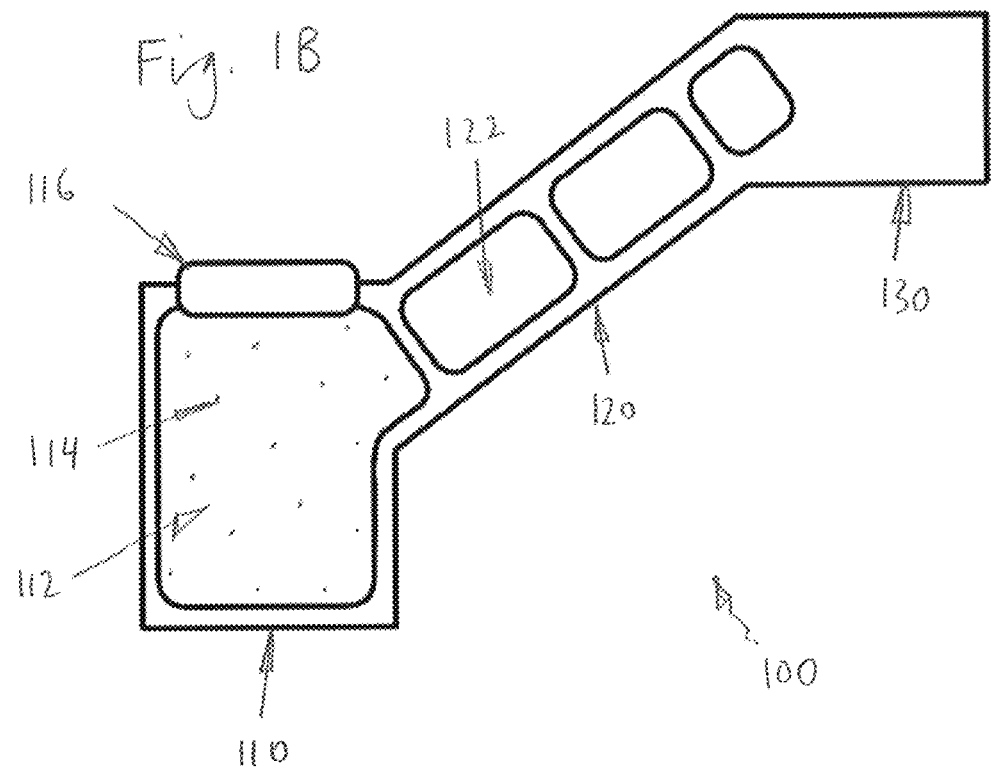

PROPELLER COUNTERWEIGHT

FOREIGN PRIORITY

This application claims priority to European Patent Application No. 16306523.8 filed Nov. 21, 2016, the entire contents of which is incorporated herein by reference.

FIELD

The present disclosure relates to a counterweight, for example a counterweight for use with a variable-pitch propeller system.

BACKGROUND

Propellers, for example aircraft propellers, typically comprise a plurality of blades fixed to a rotating propeller hub. Variable-pitch propellers are provided with a pitch change mechanism that enables the blade pitch of each blade to be controlled. For example, the blade pitch can be adjusted from a feather position (with the blades parallel to the oncoming airflow) to a reverse position.

The pitch change mechanism may be hydraulically operated. Variable-pitch propellers may be additionally provided with counterweights to serve as a fail-safe mechanism in the event of hydraulic failure. A counterweight, typically comprising an arm with a weighted mass at one end, is fixed to a base portion of each blade and produces a twisting moment on the blade such that the net moment on the blade acts in a direction to increase the blade pitch. A higher blade pitch is desirable to reduce over-speed and high drag conditions. A propeller having such counterweights is described for example in US 2014/0193253.

In the case of aircraft, it is desirable to keep the overall mass of the propeller system to a minimum, for example to provide gains in fuel efficiency. In order to keep the overall mass of the system as low as possible, while achieving the required twisting moment on the blade, the weighted mass of the counterweight is designed to be held at the largest possible radius from the rotational axis of the blade. Since the counterweight is rigidly attached to the blade, which can rotate from reverse to feather position, the counterweight must also be able to rotate from reverse to feather position. In order for the blade to transition to the feather position, the counterweight must pass by adjacent blades. This limits the distance between the weighted mass of the counterweight and the rotational axis of the blade. As a result, the mass of the weighted mass must increase to achieve the required twisting moment. It is thus desirable to design the counterweight to optimise the distribution of mass across the counterweight to ensure that the blade operates as prescribed.

Conventional counterweights are typically formed of a separate flyweight, bolted or otherwise attached to an arm.

There remains a need for an improved design of a counterweight for use in a variable-pitch propeller system.

SUMMARY

According to a first aspect, there is provided a counterweight for use in a variable-pitch propeller system, comprising: a weighted element having walls forming a sealed chamber, the sealed chamber containing a weighting material, and an arm; wherein the counterweight is configured to be coupled to a propeller blade; and wherein the walls of the weighted element and the arm comprise a single piece, and are an additively manufactured single piece.

In a further embodiment of the above, the weighting material may comprise a powder element.

In a further embodiment of the above, the sealed chamber may have been sealed during the additive manufacturing process.

In a further embodiment of the above, the sealed chamber may have been sealed after the additive manufacturing process has been completed.

In a further embodiment of the above, the sealed chamber may have a wall with an opening, the opening being sealed with a plug.

In a further embodiment of the above, the sealed chamber may have a larger interior dimension than the opening being sealed with the plug.

In a further embodiment of the above, the material density of the walls of the sealed chamber and the arm may differ from the material density of the weighting material.

In a further embodiment of the above, the weighting material may comprise high density tungsten In a further embodiment of the above, the weighting material may comprise uranium.

In a further embodiment of the above, the weighting material the walls of the sealed chamber and arm may be formed from steel.

In a further embodiment of the above, a propeller blade assembly may comprise: a propeller blade, and a counterweight constructed in accordance with any of the above; wherein the counterweight is coupled to the propeller blade.

In a further embodiment of the above, the counterweight may be coupled to a base portion of the propeller blade.

In a further embodiment of the above, a variable-pitch propeller system may comprise a counterweight or a propeller blade assembly constructed in accordance with the above.

According to a second aspect, there is provided a method of manufacturing a counterweight for a variable-pitch propeller system, the counterweight comprising a weighted element having walls forming a sealed chamber, the sealed chamber containing a weighting material, and an arm, the method comprising: integrally forming the walls of the weighted element and the arm as a single piece by additive manufacturing.

In a further embodiment of the above, the weighting material may be included in the sealed chamber during the additive manufacturing process.

In a further embodiment of the above, the weighting material may be added to the sealed chamber after the additive manufacturing process;

In a further embodiment of the above, the weighting material may comprise a powder element.

In a further embodiment of the above, the method may comprise sealing the sealed chamber during the additive manufacturing process.

In a further embodiment of the above, the method may comprise sealing the sealed chamber after the additive manufacturing process has been completed.

These and other features of the systems and methods of the subject disclosure will become more readily apparent to those skilled in the art from the following detailed description taken in conjunction with the drawings, which illustrate embodiments of the present disclosure by way of example only.

FIGURES

So that those skilled in the art to which the subject disclosure appertains will readily understand how to make and use the devices and methods of the subject disclosure without undue experimentation, embodiments thereof will be described in detail herein below by way of example and with reference to certain figures, wherein:

FIG. 1A shows a cross-sectional view of an exemplary additively manufactured counterweight for use in a variable-pitch propeller system;

FIG. 1B shows a cross-sectional view of an alternative exemplary additively manufactured counterweight for use in a variable-pitch propeller system.

DETAILED DESCRIPTION

Figure 2:
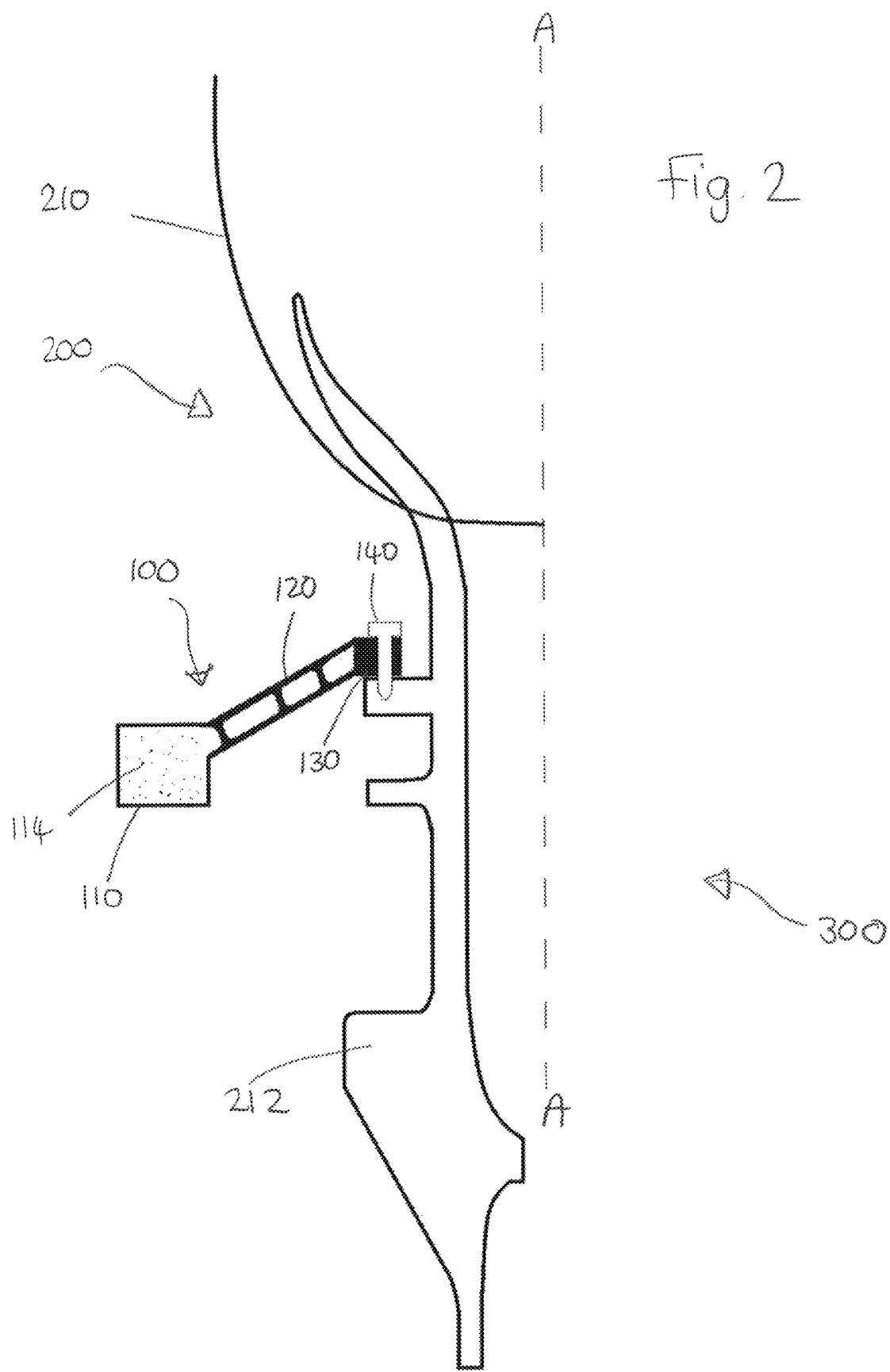
FIG. 2 shows a cross-sectional view of an exemplary variable-pitch propeller system, comprising the counterweight of FIG. 1A.

Reference will now be made to the drawings wherein like reference numerals identify similar structural features or aspects of the subject disclosure. For purposes of explanation and illustration, and not limitation, an illustrative cross-sectional view of an embodiment of a counterweight is shown in FIG. 1A and is designated generally by reference character 100. Other aspects of this disclosure are shown in FIGS. 1B and 2.

The counterweight 100 comprises a weighted element 110 and an arm 120. The weighted element 110 has walls forming a sealed chamber 112. The walls of the weighted element 110 and arm 120 comprise a single piece, i.e. are integrally formed. In other words, there is no joint between the walls of the weighted element and arm. The walls of the weighted element 110 and arm 120 are formed using additive manufacturing methods. The counterweight 100 may be considered as an additively manufactured counterweight. The counterweight is configured to be connected to a propeller blade 210.

Advantages of forming the walls of the weighted element 110 and arm 120 as a single piece include that it removes the need for the manufacture and assembly of individual component parts. It is thus quicker and cheaper to make the counterweight. In addition, machining tolerances at a joint between the weighted element 110 and arm 120 do not need to be accounted for. In conventional counterweights, the weight and arm are bolted or otherwise attached together. This can introduce a point of structural weakness at the connection, which is avoided in the present system.

The weighted element 110 may be provided at a first end of the arm 120. The weighted element 110 may comprise a sealed chamber 112 containing a weighting material as mentioned above. In an embodiment, the weighting material comprises a powder element 114. The walls of the sealed chamber 112 are integrally formed with the arm 120. The walls of the sealed chamber and the arm 120 may be considered as a counterweight frame. The walls of the sealed chamber 112 and the arm 120 may be formed of the same material, and may have a different material density to that of the powder element 114. The walls of the sealed chamber 112 and the arm 120 may be made of any appropriate material, for example steel, stainless steel, titanium or aluminium, or a combination thereof. This may be the same material of which the base portion of the blade (the blade tulip, discussed later) is made.

The sealed chamber 112 may be filled with any suitable weighting material. The weight material may have a greater density than that of the walls of the chamber and the arm. Where the weighting material comprises a powder element, the powder element 114 may be formed of any appropriate material, preferably a high-density powder, for example high-density tungsten or uranium, or a combination thereof.

The sealed chamber 112 may be sealed during the additive manufacturing process, such that all walls of the sealed chamber 112 are completely and integrally formed with the arm 120, as depicted in the embodiment shown in FIG. 1A. The powder element 114 is thus added to the sealed chamber 112 during the additive manufacturing process. Advantages of this approach include that the counterweight 100 can be manufactured to a high degree of accuracy, and that no further assembly of the counterweight 100 is required.

Alternatively, the sealed chamber 112 may be sealed after the additive manufacturing process has been completed. The counterweight 100 may be additively manufactured, leaving an opening in a wall of the weighted element 110. The powder element 114 may subsequently be added to the weighted element 110. The opening may then be sealed with a plug 116, as is shown in FIG. 1B. The sealed chamber 112 may have a larger interior dimension than the opening being sealed with the plug 116.

In an alternative embodiment, the sealed chamber 112 may be filled and sealed during a second additive manufacturing phase. The counterweight 100 may be additively manufactured in a first additive manufacturing phase, leaving an opening in a wall of the weighted element 110. Then in a second additive manufacturing phase the powder element 114 may subsequently be added to the weighted element 110 and solidified, effectively sealing the sealed chamber 112.

Where the weighted element 110 is formed through leaving an opening in a wall of the weighted element 110 and later adding the powder element 114, it may be beneficial to position the opening near to the rotational axis A of the propeller blade 210 (see FIG. 2) in order to limit the effect of centrifugal loads on the opening of the weighted element 110 when in operation.

Whilst the counterweight 100 may have a weighted element 110 comprising a sealed chamber 112 with a powder element 114 therein as described above, it will be appreciated that in other embodiments the weighted element 110 may take other forms. For example it may comprise a sealed chamber having a different material contained therein, or it may be a solid element.

Appropriate sections 122 of the arm 120 may be omitted during manufacturing to reduce the weight of the arm 120 while ensuring its structural integrity. In this way, the mass of the counterweight 100 can be focussed at the weighted element 110 end, enabling optimum operation of the counterweight.

A second end of the arm 120 may comprise an arrangement 130 for connecting the counterweight 100 to a propeller blade 210. It is anticipated that any conventional means for securing the counterweight 100 to the propeller blade 210 may be used. In the embodiment illustrated in FIG. 2, the counterweight 100 is attached to the propeller blade 210 by bolt 140. Thus, the arrangement 130 may comprise a hole for insertion of the bolt 140 therethrough. In this embodiment, the counterweight 100 is connected to a base portion 212, also referred to as the blade tulip, of the propeller blade 210.

Referring further to FIG. 2, a portion of a variable-pitch propeller system 300 is shown, which comprises a propeller blade assembly 200. The propeller blade assembly comprises a counterweight 100 attached to the propeller blade 210. The pitch of the propeller blade 210 may be adjustable via a bearing arrangement (not shown). For example, the propeller blade 210 may rotate about an axis A of the propeller blade 210. The operation of such variable-pitch propeller systems is well-known and so will not be described in detail here.

Generally, each blade of a propeller will be provided with one counterweight 100.

Regarding the manufacture of the counterweight 100 by additive manufacturing, it will be appreciated by the skilled person that the term "additive manufacturing" may describe a process where an additive manufacturing system builds up a part or parts in a layer-by-layer fashion. For example, for each layer, the additive manufacturing system may spread and compact a layer of additive manufacturing material (e.g., metal powder and/or non-metal powder) and solidify one or more portions of this material layer with an energy beam; e.g., a laser beam or an electron beam.

Any suitable known additive manufacturing process may be used for the manufacture of the counterweight of the present disclosure. For example, the additive manufacturing process may comprise at least one of: selective laser sintering, selective laser melting, direct metal deposition, direct metal laser sintering, direct metal laser melting and electron beam melting. The skilled person would appreciate that a process may be selected based on the geometry of the counterweight to be manufactured. While the apparatus and methods of the subject disclosure have been shown and described with reference to embodiments, those skilled in the art will readily appreciate that changes and/or modifications may be made thereto without departing from the scope of the subject disclosure.

The invention claimed is:

1. A counterweight for use in a variable-pitch propeller system, comprising:
   a weighted element having walls forming a sealed chamber, the sealed chamber containing a weighting material, and
   an arm;
   wherein the counterweight is configured to be coupled to a propeller blade;
   wherein the walls of the weighted element and the arm comprise a single piece, and are an additively manufactured single piece;
   wherein the sealed chamber has been sealed after the additive manufacturing process has been completed; and
   wherein the sealed chamber has a wall with an opening, the opening being sealed with a plug.

2. The counterweight of claim 1, wherein the weighting material comprises a powder element.

3. The counterweight of claim 1, wherein the sealed chamber has a larger interior dimension than the opening being sealed with the plug.

4. The counterweight of claim 1, wherein the material density of the walls of the sealed chamber and the arm differs from the material density of the weighting material.

5. The counterweight of claim 1, wherein the weighting material comprises high density tungsten or uranium.

6. The counterweight of claim 1, wherein the walls of the sealed chamber and arm are formed from steel.

7. A propeller blade assembly, comprising:
   a propeller blade, and
   a counterweight that includes:
      a weighted element having walls forming a sealed chamber, the sealed chamber containing a weighting material, and
      an arm;
      wherein the walls of the weighted element and the arm comprise a single piece, and are an additively manufactured single piece;
      wherein the sealed chamber has been sealed after the additive manufacturing process has been completed; and
   wherein the sealed chamber has a wall with an opening, the opening being sealed with a plug;
   wherein the counterweight is coupled to the propeller blade.

8. The propeller blade assembly of claim 7, wherein the counterweight is coupled to a base portion of the propeller blade.

9. A variable-pitch propeller system comprising the counterweight of claim 1.

10. A variable-pitch propeller system comprising the propeller blade assembly of claim 7.

11. A method of manufacturing a counterweight for a variable-pitch propeller system, the counterweight comprising a weighted element having walls forming a sealed chamber, the sealed chamber containing a weighting material, the sealed chamber having a wall with an opening sealed with a plug; and an arm, the method comprising:
   integrally forming the walls of the weighted element and the arm as a single piece by additive manufacturing; and
   sealing the opening of the sealed chamber with a plug after the additive manufacturing process has been completed.

12. The method of claim 11, wherein the weighting material is included in the sealed chamber during the additive manufacturing process or wherein the weighting material is added to the sealed chamber after the additive manufacturing process.

13. The method of claim 11, wherein the weighting material comprises a powder element.

14. The method of claim 12, wherein the weighting material comprises a powder element.

* * * * *